United States Patent
Cheung (10) Patent No.: US 7,370,169 B2
(45) Date of Patent: May 6, 2008

(54) EFFICIENT MEMORY CONTROLLER

(75) Inventor: Frank Nam Go Cheung, Agoura Hills, CA (US)

(73) Assignee: Raytheon Company, Waltham, MA (US)

( * ) Notice: Subject to any disclaimer, the term of this patent is extended or adjusted under 35 U.S.C. 154(b) by 365 days.

(21) Appl. No.: 10/844,284

(22) Filed: May 12, 2004

(65) Prior Publication Data
US 2004/0268030 A1    Dec. 30, 2004

Related U.S. Application Data

(60) Provisional application No. 60/484,025, filed on Jun. 30, 2003, provisional application No. 60/483,999, filed on Jun. 30, 2003.

(51) Int. Cl.
    *G06F 13/18*    (2006.01)
(52) U.S. Cl. ............................. 711/167; 711/151; 710/6
(58) Field of Classification Search .................... None
    See application file for complete search history.

(56) References Cited

U.S. PATENT DOCUMENTS

| | | | |
|---|---|---|---|
| 5,890,193 A * | 3/1999 | Chevallier | 711/103 |
| 6,212,611 B1 | 4/2001 | Nizar | |
| 6,219,769 B1 | 4/2001 | Strongin | |
| 6,304,923 B1 * | 10/2001 | Klein | 710/41 |
| 6,532,505 B1 | 3/2003 | Stracovsky et al. | |
| 6,587,894 B1 | 7/2003 | Stracovsky et al. | |
| 7,010,654 B2 * | 3/2006 | Blackmon et al. | 711/158 |

* cited by examiner

*Primary Examiner*—Gary Portka
(74) *Attorney, Agent, or Firm*—Leonard A. Alkov (57) ABSTRACT

An efficient memory controller. The controller includes a first mechanism for associating one or more input command sequences with one or more corresponding values. A second mechanism selectively sequences one of the one or more command sequences to a memory in response to a signal. A third mechanism compares each of the one or more values to a state of the second mechanism and provides the signal in response thereto. In a specific embodiment, the one or more corresponding values are execution time code values, and the second mechanism includes a sequencer state machine that provides the state of the second mechanism as a sequencer time code. In the specific embodiment, a compare module compares the sequencer time code to a time code associated with a next available command sequence and execution time code pair and provides the signal in response thereto.

1 Claim, 7 Drawing Sheets

EFFICIENT MEMORY CONTROLLER

CLAIM OF PRIORITY

This application claims priority from U.S. Provisional Patent Application Ser. No. 60/484,025 filed Jun. 30, 2003, entitled CYCLE TIME IMPROVED ESDRAM/SDRAM CONTROLLER FOR FREQUENT CROSS-PAGE AND SEQUENTIAL ACCESS APPLICATIONS, which is hereby incorporated by reference. This application also claims priority from U.S. Provisional Patent Application, Ser. No. 60/483,999 filed Jun. 30, 2003, entitled DATA LEVEL BASED ESDRAM/SDRAM MEMORY ARBITRATOR TO ENABLE SINGLE MEMORY FOR ALL VIDEO FUNCTIONS, which is hereby incorporated by reference.

BACKGROUND OF THE INVENTION

1. Field of Invention

This invention relates to memory devices. Specifically, the present invention relates to memory controllers.

2. Description of the Related Art

Memory controllers, such as Synchronous Dynamic Random Access Memory (SDRAM), Enhanced SDRAM (ESDRAM), and Virtual Channel Memory (VCM) controllers, are employed in various demanding applications including personal computers, space and airborne computing systems, tactical infrared sensor systems, and unmanned aerial vehicle guidance systems. Such applications demand efficient memory controllers that maximize memory access speed while minimizing space requirements and design complexity and costs.

Memory controllers issue command sequences, such as read and write command sequences, to memory. Conventionally, upon issuing a command sequence to memory, the controller waits for command sequence completion before issuing a subsequent command sequence. However, as a command sequence is being serviced, often no data flows to or from the memory, resulting in undesirable data gaps that reduce memory bandwidth and efficiency.

Some memory controllers employ a pipeline state machine to reduce data gaps. Pipeline state machines may employ two interleaving state machines, which allow limited memory command, address, and data flow overlapping during data transfer, which affords improvements in memory bandwidth. Memory commands that are output from the interleaving state machines are selectively multiplexed to memory at desired times to reduce data gaps. Unfortunately, currently available memory controllers, particularly ESDRAM and SDRAM controllers, are not memory cycle time-optimized. Consequently, these controllers typically fail to maximize overlap between memory commands and data flow, which yields undesirably lengthy data gaps and compromises memory bandwidth.

Conventional memory controllers, particularly conventional ESDRAM and SDRAM controllers, are often designed for sequential data access within a memory page. In applications involving random cross-page access, memory efficiency typically varies with the complexity of the accompanying memory controller. Consequently, complex and expensive memory controllers are often required to efficiently accommodate frequent random cross-page accessing.

Hence, a need exists in the art for an efficient memory controller or cycle time optimizer that is optimized for both sequential and cross-page access applications and that minimizes requisite board space and controller complexity. There exists a further need for a memory controller that effectively minimizes data gaps caused by non-optimized memory command and data flow overlap.

SUMMARY OF THE INVENTION

The need in the art is addressed by the efficient memory controller of the present invention. In the illustrative embodiment, the inventive controller is adapted for use with ESDRAM and/or SDRAM. The controller includes a first mechanism for associating one or more input command sequences with one or more corresponding values. A second mechanism selectively sequences one of the one or more command sequences to a memory in response to a signal. A third mechanism compares each of the one or more values to a state of the second mechanism and provides the signal in response thereto.

In a more specific embodiment, the one or more corresponding values are execution time code values. The second mechanism includes a sequencer state machine that provides the state as a sequencer time code. The first mechanism chooses the execution time code values in accordance with the sequencer time code. The third mechanism includes a compare module for comparing the sequencer time code to an execution time code associated with a next available command sequence and execution time code pair and provides the signal in response thereto. The compare module is incorporated within a sequencer that includes the sequencer state machine.

In the specific embodiment, the first mechanism includes a decoding module within an instruction decoder. The instruction decoder further includes a generator that provides the next available command sequence and execution time code pair. The decoding module and the compare module receive sequencer state time code data as feedback when the state of the sequencer state machine changes. The instruction decoder further includes a memory-state tracking module in communication with the decoding module. The first mechanism is implemented via the instruction decoder, and the second mechanism and the third mechanism are implemented via the sequencer. The instruction decoder and the sequencer are connected in a pipelined master-slave configuration, where the sequencer acts as the slave to the instruction decoder.

In an illustrative embodiment, the controller is part of an ESDRAM/SDRAM memory management system that further includes a memory data arbitrator that receives control input from the sequencer state machine and selectively provides data to or accepts data from the memory in response thereto. A computation system selectively provides the input command sequences to the first mechanism and selectively provides data to and/or accepts data from the memory arbitrator as needed to meet the needs of a given application.

The memory management system further includes a command arbitrator that receives commands from the computation system and selectively provides corresponding commands to the first mechanism. The command arbitrator includes a priority encoder that prioritizes and orders the corresponding commands before the corresponding commands are transferred to the first mechanism. The priority encoder also provides a command-start signal to the memory controller.

The novel design of one embodiment of the present invention is facilitated by the first and third mechanisms, which enable incoming memory commands to be serviced at optimum times, dependent on the last and the current incoming memory commands, state of the target memory, and the current state of the sequencer, which corresponds to the current state of completion of the command being serviced. By strategically assigning execution time codes to incoming memory commands and employing sequencer state information as feedback from the sequencer to the third mechanism, memory commands may be processed at optimal times. This results in fewer data bus gaps, since overlap between commands, addresses, and data may be maximized. The master-slave independent machine architecture with bi-directional variable timing handshakes as disclosed in embodiments of the present invention enables theoretical maximum memory bandwidth and reduced controller size and design complexity.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
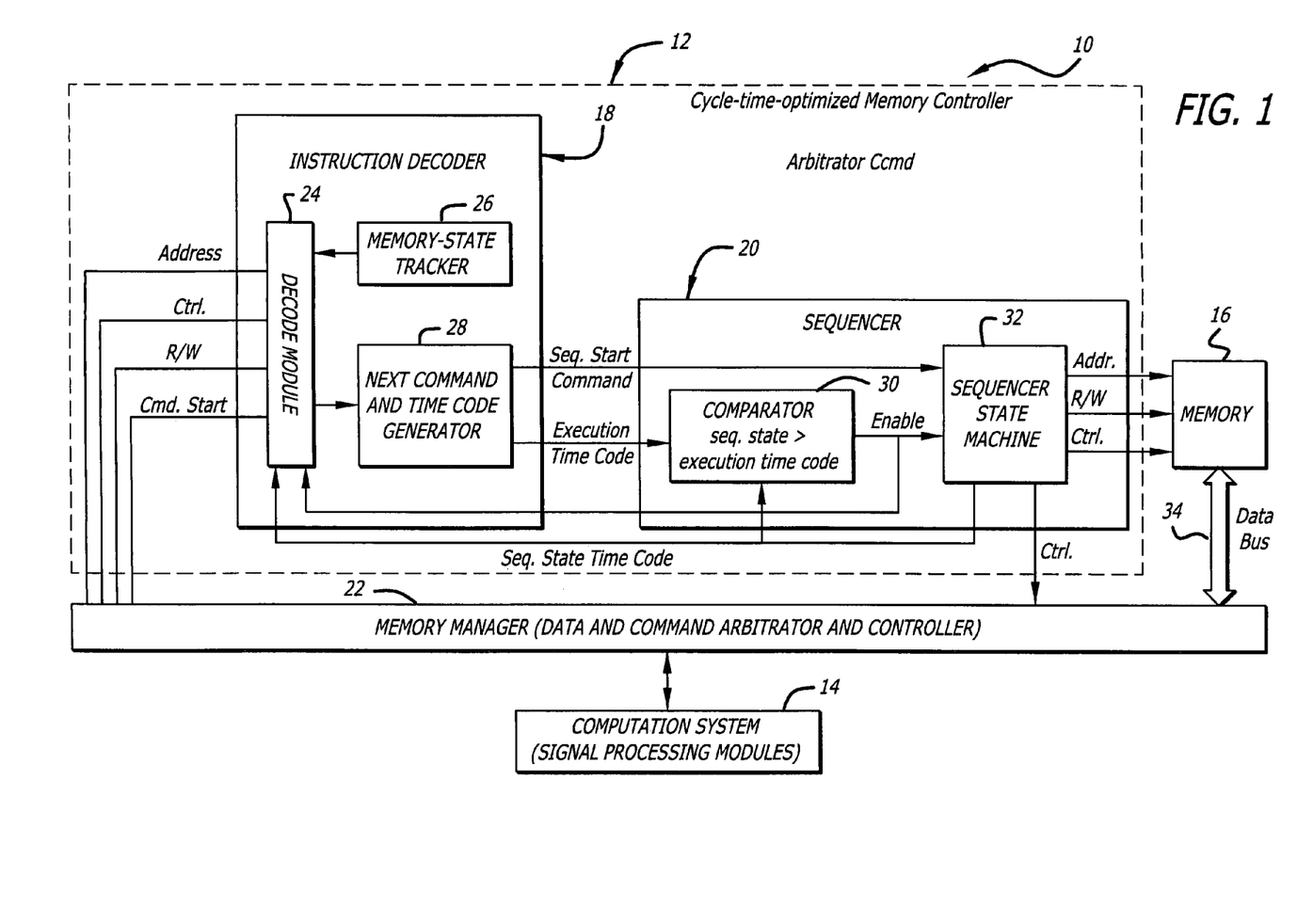
FIG. 1 is a block diagram of a system employing an efficient memory controller according to an embodiment: of the present invention.

FIG. 1 is a block diagram of a system 10 employing an efficient memory controller 12 according to an embodiment of the present invention. For clarity, various features, such as amplifiers, power supplies, flip-flops, and so on, have been omitted from the figures. However, those skilled in the art with access to the present teachings will know which components and features to implement and how to implement them to meet the needs of a given application.

The system 10 includes a computation system 14 in communication with a memory 16 via a memory manager 22 and the memory controller 12. The computation system 14 communicates directly with the memory manager 22, which routes memory commands, including address, memory start, and read/write commands, through the controller 12 to the memory 16. The memory manager 22 selectively routes data between the computation system 14 and the memory 16 via a data bus 34 in response to control signaling from a sequencer state machine 32 running on the memory controller 12. The efficient memory controller 12 may also be called a memory cycle-time optimizer. For the purposes of the present discussion, a memory controller is any system, such as a device, hardware, software, or firmware system, that effects the flow of or operation of memory commands and/or data transferred to and/or from a memory.

The controller 12 includes an instruction decoder 18 in a master-slave configuration with a sequencer 20. For the purposes of the present discussion, a master-slave relationship is a relationship between a first module(s), called a master module(s), and a second module(s), called a slave module(s), wherein the operation of the slave module is controlled by or otherwise depends on input from the master module. Two modules having a master-slave relationship are connected in a master-slave configuration.

The instruction decoder 18 receives address (Addr.), command start, and control (R/W, Ctrl.) inputs from the memory manager 22. The instruction decoder 18 may receive additional inputs, such as Data Mask (DQM), without departing from the scope of the present invention.

The sequencer 20 selectively provides address (Addr.) and control (R/W, Ctrl.) inputs to the memory 16. Control inputs provided to the memory 16 via the sequencer 20 may include various sub-level interface signals, such as Column Select (CS), Row Select (RS), Clock Enable (CKE), Row Access Strobe (RAS), and Column Access Strobe (CAS) signals.

The instruction decoder 18 includes a decode module 24 that receives input from a memory-state tracker 26 and provides output to a next command and time code generator 28, which are both included in the instruction decoder 18. The decode module 24 also receives the data and control inputs from the memory manager 22 and receives sequencer state inputs from the sequencer 20, including a sequencer state time code and a new command sequence enable signal (Enable), which may also be called a load-command (Ld Cmd) signal.

The sequencer 20 includes a comparator 30 that receives execution time code input from the next command and time code generator 28 in the instruction decoder 18 and provides enabling output (Enable) to a sequencer state machine 32. The sequencer state machine 32 receives a command signal comprising a command sequence, which includes an initial sequencer start (Seq. Start Command) command, from the next command and time code generator 28. The sequencer state machine 32 provides control output to the memory manager 22 and provides sequencer state information, which is encoded as a sequencer state time code, to the decode module 24 of the instruction decoder 18. The sequencer state machine 32 also provides control input to the memory manager 22 to selectively enable data flow from the computation system 14 to the memory 16 via the memory manager 22.

In operation, software, hardware, or firmware (not shown) running on the computation system 14, which may be a computer processor or other system, selectively stores and retrieves data from the memory 16 via the memory manager 22 and the memory controller 12. Requests from the computation system 14 to store or retrieve data to or from the memory 16 are forwarded to the memory manager 22. The memory manager 22 processes the requests and then selectively forwards them, as address and control inputs, to the decode module 24 of the instruction decoder 18 included in the memory controller 12.

The decode module 24 formats the received address and control information and incorporates the information into a particular command or command sequence to be serviced. For the purposes of the present discussion, a command may be a single command, such as a sequencer start command, or may be a sequence of commands.

The decode module 24 determines the current state of the memory 16 based on input from the memory-state tracker 26, the sequencer state time code from the sequencer state machine 32, and an enable signal from the output of the comparator 30. In the present embodiment, the memory-state tracker 26 tracks the internal states of the memory 16 after configuring the memory. The memory-state tracker 26 predicts the current state of the memory 16 based on the initial configuration of the memory 16 and the predictable behavior of the memory 16. Physical memory status signals fed back from the memory 16 are not required. However, a memory that provides status output may be employed without departing from the scope of the present invention. Those skilled in the art with access to the present teachings may readily implement the memory-state tracker 26 without undue experimentation.

The enable signal output from the comparator 30 indicates whether the sequencer state machine 32 has been enabled to accept a new command. The decode module 24 formats inputs from the memory manager 22 as needed and selectively provides them to the next command and time code generator 28.

Based on these inputs, the next command and time code generator 28 assigns an execution time code to each received command sequence, creating command and execution time code pairs. Execution time codes are assigned so that commands will be sequenced at the best times, with reference to the sequencer state time code, and in the best order. The exact details for determining the optimal command order and for assigning execution time codes to command sequences are memory and application specific and may be determined by one skilled in the art to meet the needs of a given application.

Application-specific parameters include clock speed and data format. Clock speed affects available memory operational modes. Data format is also application specific. For example, Pentium Central Processing Units (CPU's) inside personal computers are typically read or write four pieces of data for each memory burst. Other computing applications may employ full-page bursts having 256 read/writes per burst (versus four) to optimize memory bandwidth. Still other applications may employ bursts of eight for frequent cross-bank and cross-page memory access applications.

When the memory operating speed and data format is defined, command/data overlapping details are memory-specific. Although standard interface timing is defined for SDRAM, not all modes are supported by a given memory device. For example, Column Access Strobe Latency (CL) =1 mode is supported by some manufacturers for up to 50 MHz, but it is often not supported up to 66 MHz.

When clock speed, data format and memory are selected, the ideal timing to achieve maximum memory command and data overlapping for maximum data bandwidth can be determined from the manufacturer's data sheet. Then, memory controller design determines whether the ideal timing can be realized. Use of the memory controller 12 facilitates realizing ideal memory timing.

Various factors facilitate optimal time code assignments. Preferably, the next command and time code generator 28 retrieves incoming new commands as soon as possible, especially when an existing command is being executed. The next command and time code generator 28 preferably analyzes the current and next (incoming) commands to select the optimum command/data overlap timing to maximize data bandwidth based on timing options supported by the memory 16.

The instruction decoder 18 employs sequencer feedback to accommodate time-varying relationships between certain consecutive commands. To obtain the best command/data overlapping to minimize data gaps for SDRAM's and ESDRAM's, certain command combinations are handled differently depending on when the next command combinations are received by the decoder 18 relative to the current state of the sequencer 20. The memory controller 12 can generate different command sequences to the memory 16 for similar consecutive sets of commands. The command sequences sent to the memory 16 from the sequencer 20 are all based on the new command input time and the current sequencer state.

The following table indicates NOP-RD (No Operation followed by Read) states generated by the sequencer 20 in response to a write command (see WR in row CMD) with data mask (DQM) activities (DQM=H, i.e., 1 or High) at the last data (W3) of a write burst (W0 through W3) followed by a read command (see RD in CMD):

TABLE 1

```
CMD_in    ------Read----------------------
              |
              |
CMD       WR--XX--XX--XX--NOP-RD--XX--XX--XX--XX-
DQM       L---L---L---H---L---L---L---L---L---L--
DQ        W0--W1--W2--W3--ZZ--ZZ--D0--D1--D2--D3-
```

The data mask (DQM) for write operations has no delay. For read operations, the data mask (DQM) leads the data (DQ) by two clock cycles (ZZ and ZZ represent the two clock cycle delay before data (D0 through D3) is sent). If the first read data occurs within two clock cycles of DQM=H, the write mask will mask out both the last write data (W3) and the first read data (D0). In Table 1 above, the read command occurs early in the write cycle. Consequently, the sequencer 20 must generate a No Operation (NOP) state followed by a read (RD) state to prevent the first read data (D0) from being masked.

In the following Table 2, the read command (RD) occurs later in the write cycle and after a decode/command generation delay. Suppose the read command is placed as shown in Table 2 below. Since an extra clock cycle is inserted due to delay, the memory controller 12 can issue a read command directly instead of a NOP-Read combination to guarantee that the first read data (D0) will not be masked.

TABLE 2

```
CMD_in    ----------Read----------------------
              |
              |
CMD       WR--XX--XX--XX--XX--RD--XX--XX--XX--XX-
DQM       L---L---L---H---L---L---L---L---L---L--
DQ        W0--W1--W2--W3--ZZ--ZZ--D0--D1--D2--D3-
```

The master-slave relationship between the instruction decoder 18 and the sequencer 20 allows efficient command execution sequence pipelining. Sequencer state feedback from the sequencer state machine 32 enhances state look ahead.

The sequencer 20 does not open and close memory pages at every command as many controllers do. The next command and time code generator 28 employs a time code for the best new command entry timing if a new command arrives at the early stages of processing of a current command. If a new command arrives later in the current command cycle, an assigned time code will ensure that the new command will be executed as soon as possible (best after fact).

The next command and time code generator 28 monitors the sequencer state time code and the output (Enable) of the comparator 30, received via the decode module 24, to determine when to begin forwarding a particular command sequence to the sequencer state machine 32. In the present specific embodiment, the next command and time code generator 28 forwards the execution time code corresponding to the next command to be sequenced to the comparator 30 of the sequencer 20. The comparator 30 compares the current sequencer state time code to the execution time code of the next command to be sequenced.

In the present specific embodiment, if the sequencer state time code is greater than the execution time code, then the comparator 30 enables the sequencer state machine 32 to receive the next command sequence from the next command and time code generator 28. In an alternative implementation, if the sequencer state time code is less than the execution time code, then the comparator 30 enables the sequencer state machine 32 to receive the next command sequence. In another alternative implementation that is discussed more fully below, if the sequencer state time code is greater than or equal to the execution time code, then the comparator 30 enables the sequencer state machine 32 to receive the next command sequence.

The sequencer state machine 32 then begins servicing the next command sequence. The resulting enable signal output from the comparator 30 is forwarded to upstream electronics, including the decode module 24 to facilitate command ordering and/or execution time code assignment.

When the sequencer state machine 32 services a command sequence, it provides address and control signaling corresponding to the command sequence to the memory 16. The sequencer state machine 32 also provides a control signal to the memory manager 22, enabling the memory manager 22 to selectively transfer data between the computation system 14 and the memory 16 as required by the command sequence being serviced by the sequencer state machine 32.

The inventive design of the memory controller 12 is facilitated by the novel use of the sequencer state time code as feedback to the instruction decoder 18, which uses the feedback to select an appropriate command sequence in accordance with an execution time code assigned to the command sequence. Selectively providing sequencer state feedback to the instruction decoder 18 results in a look-ahead effect than enables the instruction decoder 18 and sequencer 20 to work together to optimally sequence commands.

For example, in the present specific embodiment, suppose the sequencer state time code may represent one of eight possible states denoted by the set of integers 1 through 8. Further suppose that the execution time code that is assigned to a given command sequence is also represented by one of eight possible states denoted by the set of integers 1 through 8. In an exemplary implementation, when no commands are being serviced, and the instruction decoder 18 has no command sequence to schedule, then the execution time code and the sequencer state time code are assigned a value of 8. Accordingly, since the sequencer state time code is not greater than the execution time code as determined by the comparator 30, then the sequencer state machine 32 will not be active. In the present example, suppose that when a new command sequence arrives the execution time code is assigned a value of 5.

The comparator 30 then determines that the execution time code (5) is less than the sequencer state time code (8), and consequently, activates the sequencer state machine 32. The sequencer state machine 32 then services the command sequence, which is output from the next command and time code generator 28. When the command sequence is loaded into sequencer state machine 32, the sequencer state machine 32 changes the sequencer time code based on the loaded command sequence. As the command sequence is being serviced, the sequencer state machine 32 continues to increment the sequencer state time code in accordance with the progress of the command sequence being serviced. However, upon reaching 8, the sequencer state time code stays at 8 to indicate that the sequencer state machine 32 has completed a given command.

Suppose that a subsequent command arrives at the instruction decoder 18 and is assigned an execution time code of 6 based on inputs from the sequencer 20 and memory-state tracker 26. Suppose that the command sequence currently being serviced now yields a sequencer state time code of 5. Since the sequencer state time code (5) is not greater than 6, the next command sequence is not serviced. When the sequencer state time code passes 6, i.e., reaches 7 or higher, the next command sequence is serviced. A signal indicating that servicing of the next command sequence has been initiated is fed back to the decode module 24 via the enable signal (Enable) output from the comparator 30. This facilitates execution time code assignment by the instruction decoder 18. The enable signal (Enable) also resets the execution time code to 8 to prevent repeat execution of the command being executed. The command and time-code generator 28 generates a new execution time code when new command arrives.

Alternatively, a command-waiting signal from the instruction decoder to the sequencer 20 indicates whether a new command is waiting to be loaded by the sequencer 20, as discussed more fully below with reference to FIG. 4. The command-waiting signal is set to 1 when the next command and time code generator 28 generates a new command and time code, and is reset when the command is serviced by the sequencer 20.

Hence, the decode module 24 translates current and next memory requests (command sequences), sequencer state variables, and memory state variables into proper inputs to the command and time-code generator 28. The command and time-code generator 28 then selects the best sequencer start command and execution time code combination from a total of 128 different combinations via an exhaustive search through a look-up table (not shown). The sequencer 20 then compares its own state time code to the execution time code via the comparator 30.

Hence, the instruction decoder 18 tracks internal memory states via the memory-state tracker 26 and computes a best command and execution time code combination based on current and previous memory cycles, memory state, and sequencer state when a memory request is serviced. The sequencer 20 compares the execution time code to its own state to determine when to implement the command associated with the execution time code.

When the sequencer 20 accepts the new command, the instruction decoder 18 is free to service the next memory request. When the new command sequence is sent to the memory 16, the sequencer 20 may forward a command-sent signal, as discussed more fully below, to upstream or downstream electronics, such as the instruction decoder 18 or memory manager 22 to indicate data start and time for the next memory request. In the present embodiment, the sequencer state machine 32 is a one-shot machine.

In an alternative implementation, at steady idle state, both the instruction decoder 18 and the sequencer 20 initially have the same time code of 1, and sequencer state time codes are reduced as processing progresses until reaching 1, where the code stays at 1. In this case, the comparator 30 would selectively enable the servicing of a subsequent command sequence when the sequencer state becomes less than the execution time code. Upon receiving a first command sequence, the sequencer state time code will be 1, while an execution time code will be set to a higher value, such as 6, depending on characteristics of the command to be sequenced. Exact details of methods employed to assign execution time codes are application specific and may be determined by those skilled in the art without undue experimentation. Accordingly, since the sequencer state time code will be less than the execution time code, the command sequence will be serviced immediately. After the command is sent to the sequencer 20 for processing, the execution time code associated with the next command and time code generator 28 is reset to 1.

Hence, in the alternative implementation, when sequencer state machine 32 is executing the current memory request, its state time code changes (reduced) to reflect where it is at the command sequence. After the sequencer 20 loads in the current command sequence, the instruction decoder 18 is free to accept new memory requests. When next memory request arrives at the instruction decoder 18, a new execution time code is assigned to the command sequence. If sequencer state time code is greater than execution time code, then the new command sequence, i.e., memory request cannot be executed yet. The sequencer 20 continues the current command sequence until the sequencer state time code is less than the execution time code before sending the new command sequence to the memory 16 at the optimal time. Accordingly, gaps in data flowing between the computation system 14 and the memory 16 are minimized due the efficient command sequencing by the controller 12

Those skilled in the art will appreciate that other methods for assigning values and adjusting values to indicate the current state of the sequencer state machine 32 and other mechanisms to generate the enable signal in response to the sequencer state feedback may be employed without departing from the scope of the present invention. Furthermore, various modules required to implement the system 10 may be constructed or otherwise obtained by those skilled in the art with access to the present teachings without undue experimentation. For example, various modules employed to implement the memory manager 22, such as data arbitrators and command arbitrators and accompanying memory buses and command generators are readily available.

In the present embodiment, the memory controller 12 is adapted for use with additional memory control functionality implemented via the memory manager 22. The additional memory control functionality may include a command arbitrator module, in communication with various address and command generators (not shown) whose outputs are selectively multiplexed to the controller 12. An exemplary data arbitrator that may be employed to facilitate implementing the memory manager 22 is discussed more fully below and in U.S. patent application Ser. No. 10/878,893, filed Jun. 28, 2004, entitled SYSTEM AND METHOD FOR SELECTIVELY AFFECTING DATA FLOW TO OR FROM A MEMORY DEVICE, which is assigned to the assignee of the present invention and is incorporated by reference herein.

In the present specific embodiment, the memory 16 is a Synchronous Dynamic Random Access Memory (SDRAM) or an enhanced SDRAM (ESDRAM), which is discussed more fully below. The unique cycle-time optimizer 12 is particularly suited to maximize command, address, and data overlapping between two consecutive ESDRAM or SDRAM memory cycles, thereby optimizing memory bandwidth.

Unlike certain commercially-available controller instruction decoders, the instruction decoder 18 is not required to incorporate a special module to determine sequencer states, since the sequencer 20 provides the state information as feedback. This eliminates lengthy state machine turn-around time or state machine ping-pong time associated with certain conventional controllers, thereby facilitating optimal command/address overlap and reduced design complexity.

Using sequencer state feedback for the next command and execution time code generation by the generator 28 provides a state-look-ahead effect for the best possible command/address overlap between memory cycles. However, the sequencer state feedback from the sequencer 20 to the instruction decoder 18 may be omitted without departing from the scope of the present invention.

The time code generation and associated command execution timing scheme employed in various embodiments of the present invention greatly reduces controller design complexity. Furthermore, time code comparison performed by the comparator 30 helps to ensure that the sequencer state machine 32 will execute the next command sequence at the optimal time as ordered by the instruction decoder 18, or as soon as possible, independent of when the time code is generated. In addition, time code comparison by the comparator 30 frees the instruction decoder 18 to service the next memory request while the current command sequence is being sent to the memory 16. This can happen while the memory 16 is bursting data associated with a previous command. Consequently, virtually all three pipelined machines 18, 20, 16 may be fully utilized simultaneously, thereby minimizing data gaps and maximizing memory utilization. Computing systems employing memory controllers constructed according to embodiments of the present invention may require fewer ESDRAM and/or SDRAM devices to achieve a desired memory bandwidth.

Figure 2:
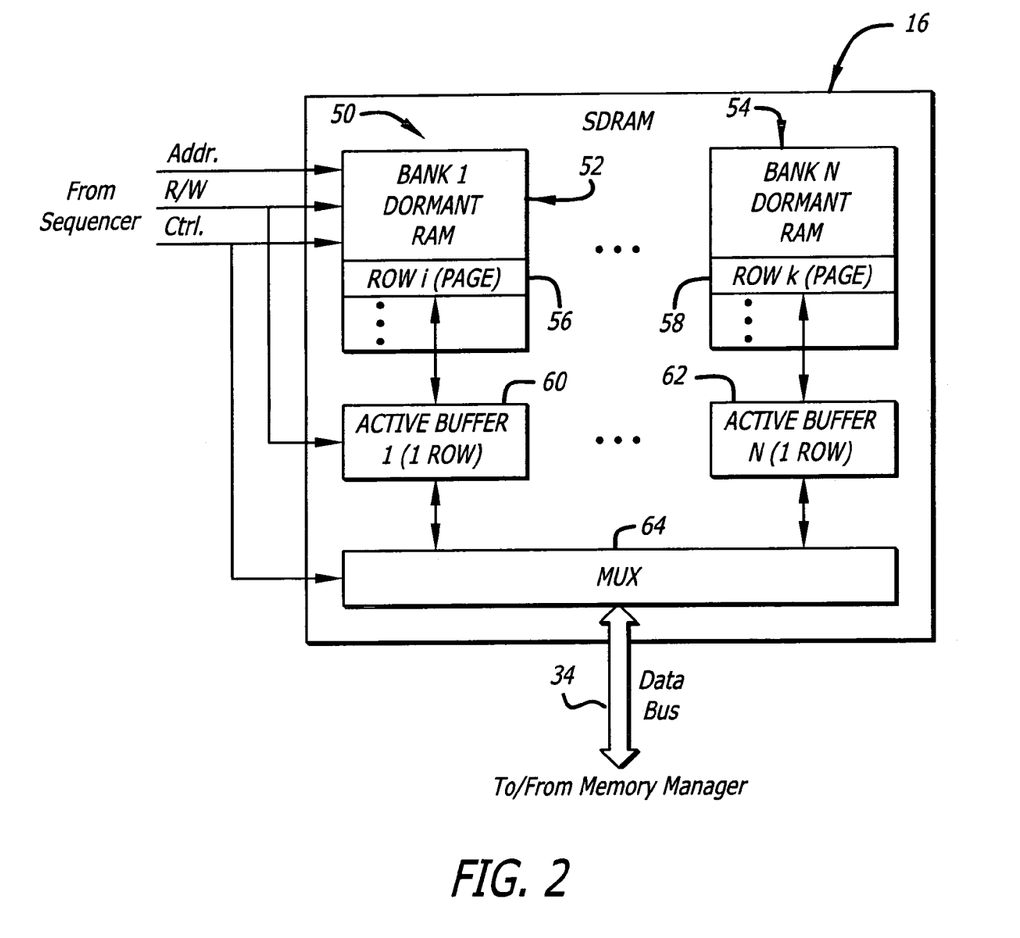
FIG. 2 is a more detailed diagram of an exemplary SDRAM controlled by the memory controller of FIG. 1.

FIG. 2 is a more detailed diagram of an exemplary SDRAM 16 controlled by the memory controller 12 of FIG. 1. The SDRAM includes N various memory banks 50. A first memory bank 52 and an $N^{th}$ memory bank 54 are shown for illustrative purposes. Each of the N memory banks 50 receives address (Addr.), read/write (R/W), and control (Ctrl.) inputs from the sequencer 20 of FIG. 1. Data corresponding to specific addresses is selectively transferred to and from the memory banks 50 via corresponding active buffers, also called sense amplifiers, which are illustrated by a first active buffer 60, corresponding to the first memory bank 52, and an $N^{th}$ active buffer 62 corresponding to the $N^{th}$ memory bank 54. Each active buffer 60, 62 may include read/write (R/W) and/or other control inputs from the sequencer 32 of FIG. 1 to facilitate selectively moving data through the buffers 60, 62. The buffers 60, 62 each communicate with a multiplexer 64 that selectively switches between outputs and/or inputs of the active buffers 60, 62 as needed in response to control signaling from the sequencer 32 of FIG. 1.

In operation, to read or write to a dormant memory area of one of the memory banks 50, an activate command must be issued to bring a row of data, such as row i 56 of the first memory bank 52 or row k 58 of the $N^{th}$ memory bank, from dormant memory 52, 54 into the corresponding active buffer 60, 62. Read or write commands can then be issued to the active buffer 60, 62 to effect data transfer to or from the memory banks 52, 54.

When writing to a new row, a precharge command is issued from the sequencer 32 of FIG. 1 before activating a new row of a memory bank 52, 54 in preparation for writing the content of an active buffer 60, 62 into the memory bank 52, 54. One memory bank may be precharged at a given time or all memory banks may be precharged simultaneously. However, often only the memory bank that will be written to is precharged. Each of the ESDRAM buffers 60, 62 may contain data from similar or different pages of the corresponding dormant RAM 52, 54. Accordingly, plural memory pages may be opened simultaneously, which may reduce page-crossing time.

For different memory internal states and different consecutive memory requests, various memory-timing limitations may cause data gaps between memory cycles, which should be minimized to achieve optimal memory bandwidth. The controller 12 of FIG. 1 performs this function.

The memory controller 12 is particularly useful in applications involving many cross-page operations, where conventional controllers are more likely to produce many undesirable data gaps. In a so-called cross-page operation, initially a particular row of a memory bank, which is also called a page, is loaded into an active buffer. To access a different row (page) and complete the cross-page operation, the contents of the loaded buffer must be transferred back into the memory bank, and then the new row must then be written to the buffer. Conventional controllers often inefficiently handle cross-page operations, resulting in excessive data gaps in the data bus, thereby reducing memory bandwidth.

Those skilled in the art will appreciate the other types of memories, such as ESDRAM memories and Virtual Channel Memories (VCM's), may be employed for the purposes of the present invention without departing from the scope thereof. ESDRAM, SDRAM, and VCM are widely used memories.

For SDRAM, such as the SDRAM 16 of FIG. 2, each memory bank 52, 54 has a single active buffer 60, 62 that can be read from or written to. For ESDRAM (not shown), each memory bank has an active area containing a read-only buffer and a separate write-only buffer. Each active area can contain data from same or different pages of the corresponding dormant RAM, and both can be kept active simultaneously. Accordingly, ESDRAM may particularly benefit from the memory cycle time optimizers 12, 12' disclosed in various embodiments of the present invention.

Virtual Channel SDRAM (VCSDRAM or VCM) memories have memory banks that can each access multiple buffers. VCM's often have programmable buffers, called virtual channels. The virtual channels may be programmed to connect to any memory bank. This enables different numbers of buffers to connect to different banks as needed. Accordingly, memory bandwidth is enhanced. Systems employing VCM memories would greatly benefit from embodiments of the present invention.

Figure 3:
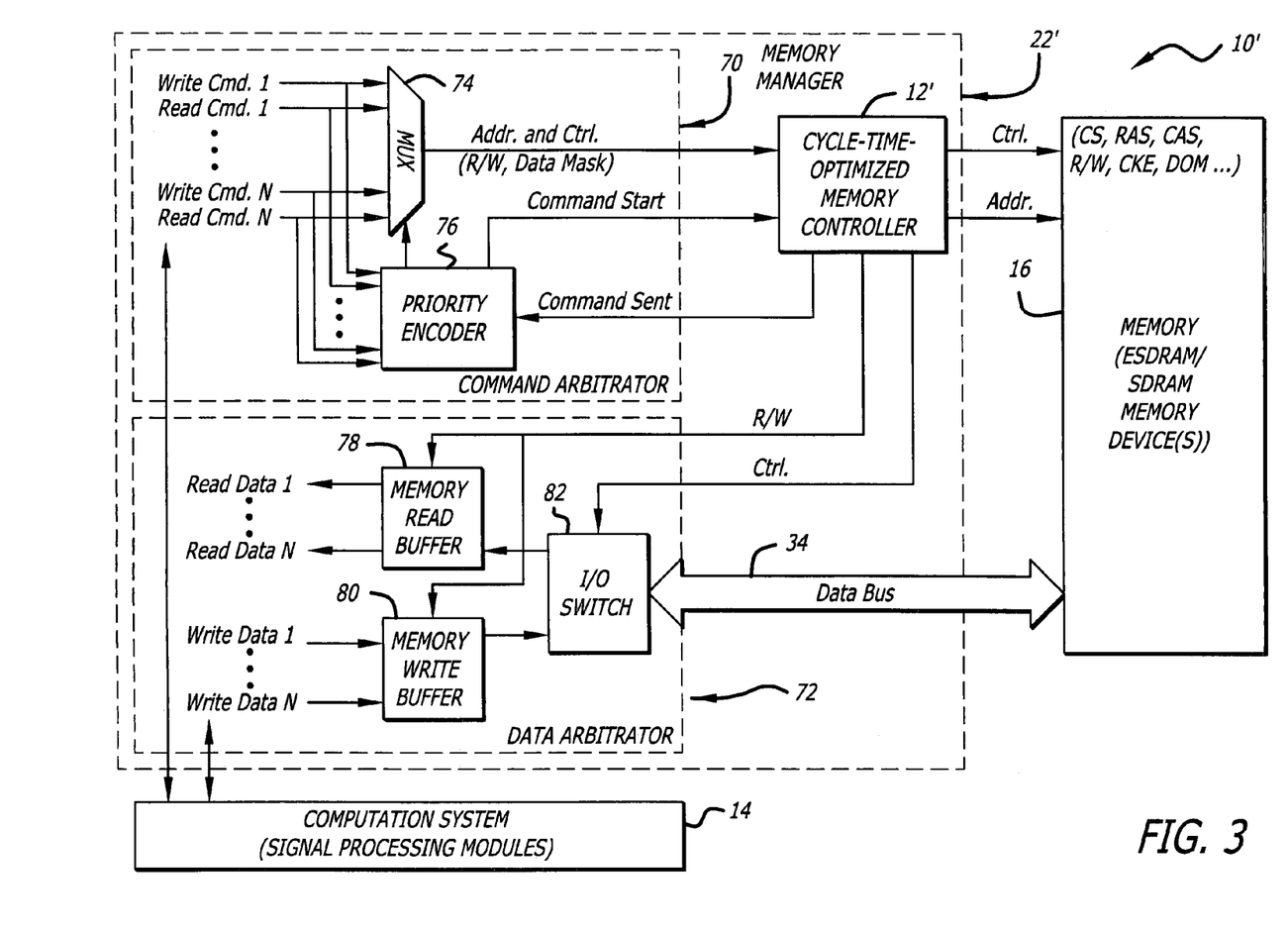
FIG. 3 is a block diagram of an alternative embodiment of the system of FIG. 1 illustrating the memory manager in more detail.

FIG. 3 is a block diagram of an alternative embodiment 10' of the system 10 of FIG. 1 illustrating the memory manager 22' in more detail. The alternative memory manager 22' includes a command arbitrator 70 and a data arbitrator 72, both of which communicate with the computation system 14.

The command arbitrator 70 includes a multiplexer (MUX) 74 that receives control input from a priority encoder 76. The priority encoder 76 also provides a command-start input to and receives a command-sent input from the memory controller 12'. The MUX 74 receives various input and output memory request commands, which originated from the computation system 14, but have been formatted as needed by modules (not shown) running on the command arbitrator 70. The priority encoder 76 also receives corresponding input and output memory requests (commands) and prioritizes them in accordance with a predetermined algorithm. The memory requests are sent to memory controller 12', one at a time, in order of priority so that commands associated with a higher priority are serviced by the memory controller 12' first.

The priority encoder 76 generates the select signal to the MUX 74 in accordance with the priority of each received command. For example, the highest priority command as determined by the priority encoder 76 will result in a MUX enable signal that causes the corresponding command to appear at the output of the MUX 74. The output of the MUX 74, which is input to the memory controller 12', represents the highest priority command among the input commands as determined by the priority encoder 76. Each command may include information such as data address, read/write, and data mask information.

Hence, the priority encoder 76 prioritizes the memory requests from the signal processing modules (computation system) 14, selects the appropriate request, and sends a command-start signal to the memory controller 12', which optimizes the memory cycles. After the current command is executed, the memory controller 12' issues a command-sent signal to the priority encoder 76 acknowledging that another memory command may be received by the memory controller 12'. The memory controller 12' also provides control signals to the data arbitrator 72 to control data flow along the data bus 34 between the data arbitrator 72 and the memory 16.

The data arbitrator 72 includes a memory read buffer 78 and a memory write buffer 80, which receive read/write control inputs from the memory controller 12'. The memory read buffer 78 and the memory write buffer 80 receive data from and provide data to the memory 16, respectively, via an Input/Output (I/O) switch 82 and the data bus 34. The I/O switch 82 receives control input from the memory controller 12' to facilitate switching between reading and writing operations along the data bus 34. The memory read buffer 78 provides data that has been read from the memory 16 to the computation system 14. Similarly, data to be written to the memory 16 is received by the memory write buffer 80 from the computation system 14. Various other modules, such as formatting modules (not shown) used to format the read and write data may be employed without departing from the scope of the present invention.

In the present embodiment, the memory controller 12' is considered as part of the memory manager 22'. The MUX 74 and the priority encoder 76 may be incorporated as part of the memory controller 12' without departing from the scope of the present invention. Furthermore, the memory buffers 78, 80 may be implemented as First In First Out (FIFO) buffers in accordance with the above-identified U.S. patent application, Ser. No. 10/878,893, and corresponding provisional application incorporated by reference herein.

Figure 4:
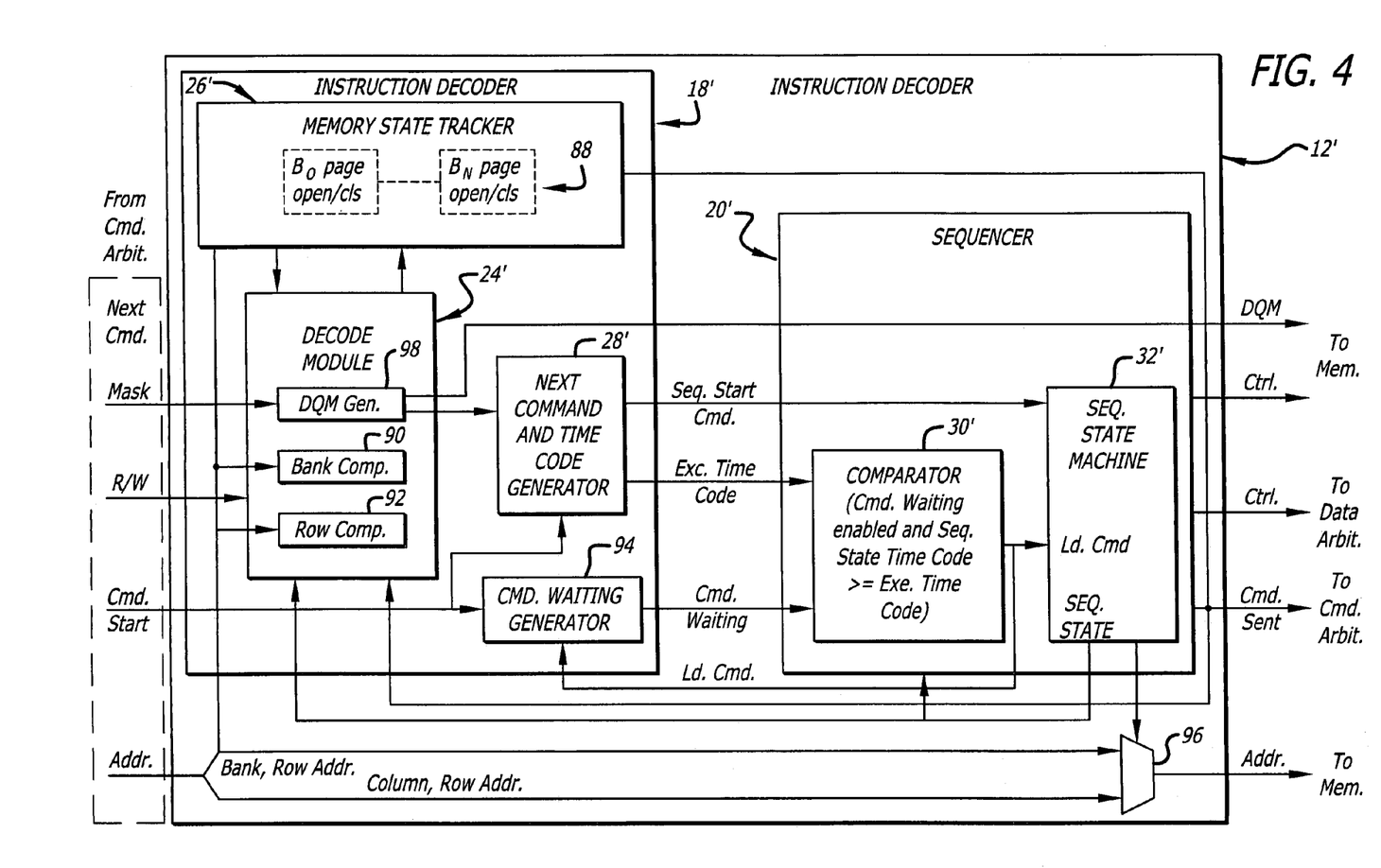
FIG. 4 is a more detailed block diagram of an alternative embodiment of the memory controller of FIG. 3.

FIG. 4 is a more detailed block diagram of an alternative embodiment 12' of the memory controller 12' of FIG. 3. With reference to FIGS. 3 and 4, the memory controller 12' includes an alternative instruction decoder 18' and sequencer 20' arranged in a master-slave relationship. The alternative decode module 24' communicates with the memory-state tracker 26', which maintains information 88 pertaining to the open/closed status of various pages of the memory 16 of FIG. 3. The decode module 24' includes a data mask (DQM) generator 98 that receives a mask input, associated with the next command to be serviced, from the memory manager 22' and selectively provides a corresponding data mask control (DQM) input to memory 16.

A read/write signal of the next command to be serviced (next command) is input to the decode module 24', which employs a bank comparator 90 to determine if the next command will cause a cross-bank condition with the command currently being serviced. The decode module 24' includes a row comparator 92 that determines if the next command (new memory request) will cause a cross-page condition in the memory 16. If a cross-bank and/or cross-page condition is evident, the decode module 24' sends update signals to the memory state tracker 26', which tracks the internal states of the memory 16.

The memory state tracker 26' receives the update signals, the bank, and row information from the address bus (Addr.), and updates the corresponding bank-open/close flags 88 when a command is executed by the sequencer state machine 20' (when Cmd sent=1). Output signals from memory state tracker 26' may provide bank-open/close information for the last and the new commands. This information may be used by the next command and time code generator 28' to help determine the best sequencer start command and execution time code in accordance with a predetermined application-specific algorithm.

Appropriate signals are sent from decode module 24' to the next command and time code generator 28' regardless of whether a cross-bank or cross-page condition occurs. The next command and time code generator 28' then assigns an appropriate execution time code to the next command in response thereto.

Memory address information received from the memory manager 22' and corresponding to the next command, is fed to the memory-state tracker 26' and to the decode module 24'. The decode module 24' employs the address information to facilitate cross-bank and cross-page comparisons.

A command-start signal from the priority encoder 76 of FIG. 3 is sent to the next command and time code generator 28' and a command-waiting generator 94. The next command and time code generator 28' selectively forwards a corresponding sequencer start command to the sequencer state machine 32'. The command-waiting generator 94 forwards a command-waiting signal to the sequencer comparator 30' and receives a loaded command signal from the sequencer comparator 30' when the sequencer state machine 32' is loaded with a command. When the sequencer state machine 32' sends a command to memory, a command-sent signal is fed back to the decode module 24'.

The row and column address associated with the current command is also forwarded to the input of an address MUX 96, which receives control input from the sequencer state machine 32'. The address MUX 96 selectively outputs the bank number and row address or the bank number and column address to the memory in response to the control signal from the sequencer state machine 32'.

The sequencer state machine 32' also provides various control inputs, such as Column Select (CS), Row Access Strobe (RAS), Column Access Strobe (CAS), R/W, Clock Edge Select (CKE), and Data Mask (DQM) signals corresponding to the current memory request (command) to the memory 16. Data bus and memory buffer control signals are fed back from the sequencer 20' to the data arbitrator 72 of FIG. 3. The command-sent signal is also fed back to the priority encoder 76 of the command arbitrator 70 of FIG. 3.

In the present alternative embodiment, the memory controller 12' is a master-slave pipelined machine with bi-directional handshake and feedback between the sequencer 20' and instruction decoder 18'. The master is the instruction decoder 18', and the sequencer 20' is the slave module. The input address splits into row and column addresses to conform to the time multiplexing requirement of ESDRAM/SDRAM addresses.

The outputs of the instruction decoder 18' are time-dependent. The instruction decoder 18' translates current and subsequent memory requests, sequencer state variables, memory state variables, and data mask conditions into proper inputs to the next command and time-code generator 28'. Those skilled in the art will appreciate that use of the data mask (DQM) generator 98 may reduce sequencer design complexity.

The next command and time-code generator 28' selects the best sequencer start command and execution time code combination through a look-up table when the command-start signal from the memory manager 22' of FIG. 3 is enabled. The command-waiting generator 94 selectively issues a command-waiting signal that informs the sequencer 20' if a new command is waiting to be serviced. The memory-state tracker 26' tracks the internal states of the ESDRAM/SDRAM memory 16 and tracks the open or closed status for each bank of the memory 16 and the addresses of the opened page for each bank (see FIG. 2). The memory-state tracker 26' is updated when a memory command is executed by the sequencer 20'.

The sequencer comparator 30' compares the sequencer state time code with the execution state time code from the instruction decoder 18' when a new command is waiting to be executed as indicated by a command-waiting signal from the command-waiting generator 94. In the present alternative embodiment, if sequencer state time code is greater than or equal to the execution time code associated with the command that is waiting, the sequencer start command is loaded into the sequencer state machine 32' for execution.

The sequencer state machine 32' is a one-shot state machine. At idle state, the sequencer state time code is set to max. When a command is loaded into the sequencer state machine 32', the sequencer state time code is loaded with a lowered value, such as a minimum value, and continues to increase to max value upon command execution completion. The sequencer state machine 32' then returns to the idle state.

At steady idle state, the command-waiting signal from the command-waiting generator 94 is disabled; the sequencer state machine 32' exhibits the maximum time code and is not servicing commands. When a new memory request arrives at the instruction decoder 18', the command-waiting signal that is input to the sequencer comparator 30' is enabled. The execution time code, which will be less than maximum, is then compared, via the sequencer comparator 30', to the sequencer state time code, which is initially set to maximum. Accordingly, the new command is executed immediately by the sequencer 20'. If a new memory request is issued when the sequencer state machine 32' is executing the current memory request, the time-code comparison feature ensures that the new command will wait to be executed until an appropriate execution time.

Figure 5:
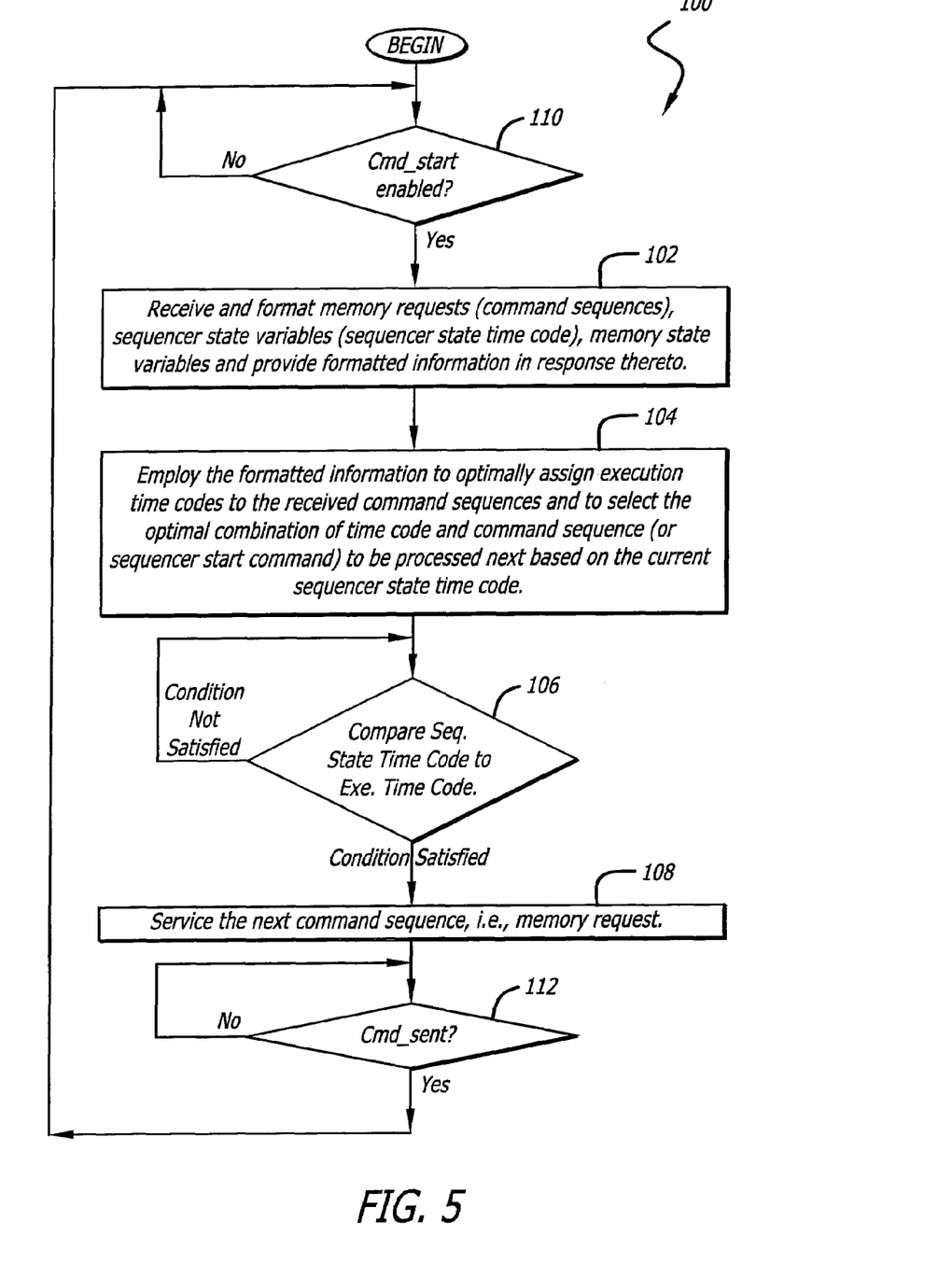
FIG. 5 is a flow diagram of a method adapted for use with the memory controllers of FIGS. 1, 3, and 4.

FIG. 5 is a flow diagram of a method 100 adapted for use with the memory controllers 12, 12' of FIGS. 1, 3, and 4. With reference to FIGS. 1 and 5, in an initial command-start step 110, the instruction decoder 18 determines if a command start signal is enabled, indicating that a memory request is pending. When a memory request is pending, control is passed to a receiving step 102.

In the receiving step 102, the instruction decoder 18 of the memory controller 12 receives and selectively formats memory requests. (also called command sequences), sequencer state variables (including sequencer state time codes), and memory state variables maintained via the memory-state tracker 26.

The resulting selectively formatted information is employed in a subsequent formatting step 104. In the formatting step 104, the resulting information is employed by the next command and time code generator 28 to optimally assign execution time codes to received command sequences corresponding to memory requests. The resulting command sequence and execution time code pairs may be analyzed via a special priority encoder (see 76 of FIG. 3) to enable the instruction decoder 18 to determine the optimal command sequence to be processed next. Alternatively, commands are received and processed by the instruction decoder 18 one at a time so that a given received command sequence is assigned an execution time code, which determined when it will be serviced by the sequencer 20. In this case, command priority ordering may be performed, such as by the priority encoder 76 of FIG. 3, before the instruction decoder 18 assigns execution time codes. The time at which a given command sequence is processed is a function of its assigned execution time code and the current sequencer state time code.

In a subsequent comparing step 106, the execution time code for the command sequence to be processed next is compared to the sequencer state time code based on one or more predetermined comparison criteria, such as greater than or equal to comparisons. If the results of the comparison satisfy the desired criteria or a desired condition is satisfied, then control is passed to a servicing step 108. Otherwise, control is passed to back to the compare step 106. While it is not shown in FIG. 5, note that during operation of the method 100, the state of the sequencer 20 is continually updated by the sequencer 20 as the sequencer 20 processes a given command. Accordingly, the method will not enter an infinite loop at step 106 due to a static sequencer state.

In the servicing step 108, the command sequence associated with the execution time code that satisfied one or more desired conditions or criteria in the compare step 106 is serviced by the sequencer 20. The sequencer state time code is updated during servicing. Subsequently, control is passed to a command-sent-checking step 112, wherein the command-sent signal output from the sequencer state machine (see 32' of FIG. 4) is checked to determine if a command has been sent to memory by the sequencer 20 or 20'. If the command has been sent, then control is passed back to the initial command-start step 110. Otherwise, control is passed back to the command-sent-checking step 112. Note that during operation of the method 100, the state of the sequencer 20 of FIG. 1 is continually updated by the sequencer 20 as the sequencer 20 processes a given command. Accordingly, the method 100 will not enter an infinite loop at step 112 due to a static sequencer state.

Figure 6:
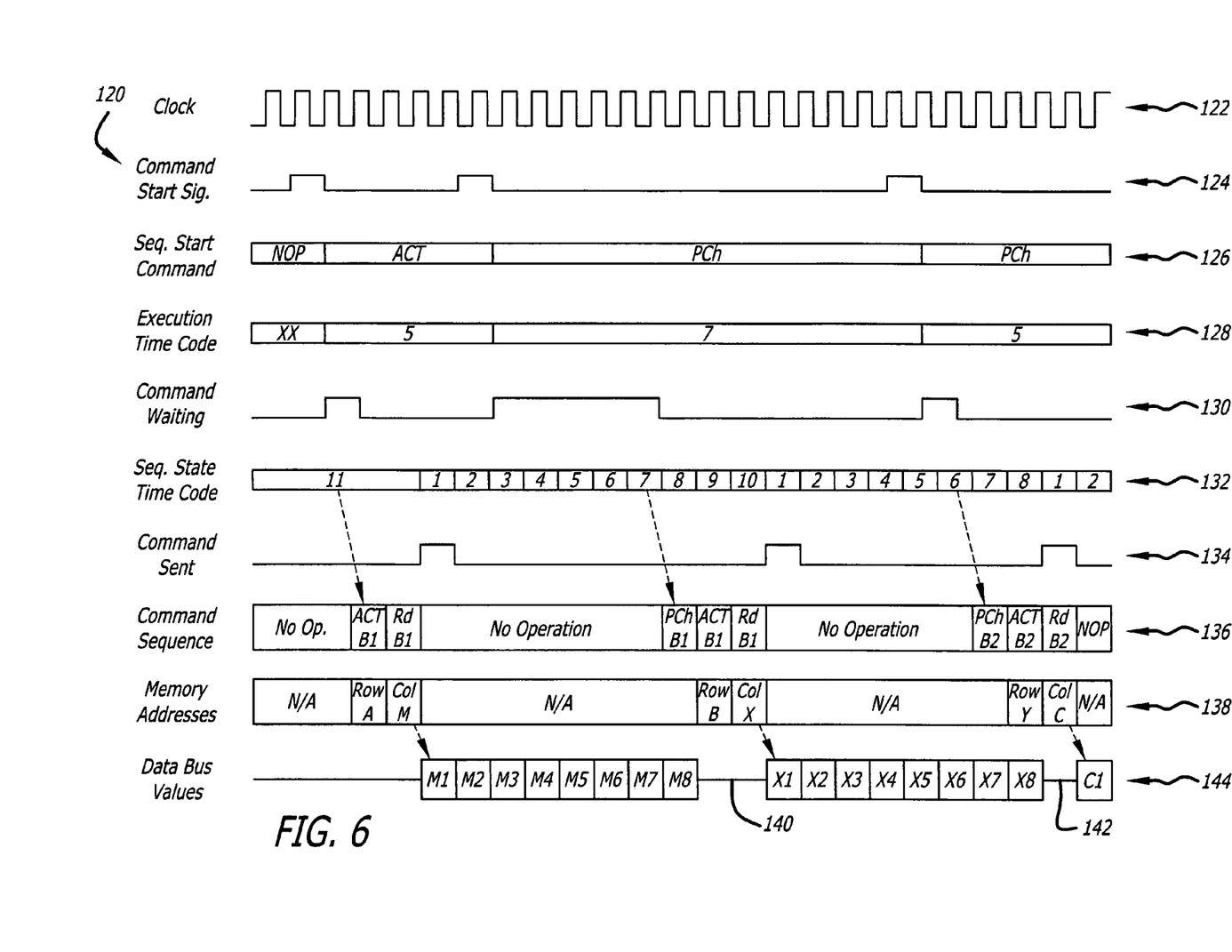
FIG. 6 is a timing diagram illustrating minimum data gaps on an SDRAM data bus for an SDRAM controller constructed according to an embodiment of the present invention.

FIG. 6 is a timing diagram 120 illustrating minimum data gaps on the SDRAM data bus 34 of FIG. 3 for an SDRAM controller (see 12 of FIGS. 3 and 12' of FIG. 4) constructed according to an embodiment of the present invention. The timing diagram 120 illustrates an exemplary clock signal 122, a command-start signal 124, a sequencer start command signal 126, execution time code values 128, a command-waiting signal 130, a sequencer state time codes 132, command-sent signal 134, SDRAM command sequences 136, SDRAM addresses 138, and an SDRAM data bus sequence 144. The data bus sequence 144 is sent along the SDRAM data bus 34 of FIGS. 1, 2, and 3.

The timing diagram 120' illustrates the operation of the controller 12' of FIG. 4 and the system 10' of FIG. 3. With reference to FIGS. 3, 4, and 6, the ESDRAM/SDRAM 16 is set to operate with Column Access Strobe Latency (CL)=1 and Burst Length (BL)=8. All memory requests, i.e., command sequences 136, are associated with read (Rd) operations.

The exemplary scenario illustrated by the timing diagram 120 begins in the steady state condition, wherein the signal command-waiting signal 130 is 0 (disabled) and the sequencer state 132 is 11 (max). A new command is initiated, and the command-start signal 124 is set to 1. The command-waiting signal 130 is then enabled, and a new start command 126 (Activate (ACT)) and execution time code (5) combination (ACT, 5) is issued at the next clock cycle.

When command-waiting signal 130 is enabled, the sequencer state 132 is 11, which is greater than execution time code 128, which is 5. Accordingly, the sequencer start command 126 (ACT) is loaded into the sequencer state machine 32' of FIG. 4 at the next clock cycle, and the new SDRAM command sequence 136 (ACT bank 1 (B1), Rd B1) is executed immediately.

The command-waiting signal 130 is disabled upon loading of the new SDRAM command sequence 136 (ACT B1, Rd B1) to stop further commands from being loaded into sequencer 20'. When the sequencer 20' finishes sending memory control commands to the SDRAM 16 of FIG. 3, command-sent signal 134 is enabled for one clock cycle, thereby signaling that the controller 12' is able to accept another memory command.

While the current SDRAM command 136 (ACT B1, Rd B1) being executed, and the SDRAM 16 is in data burst mode, the second memory command indicated by the command-start signal 124 is received by the instruction decoder 18' of FIG. 4. The next command and time code generator 28' assigns an optimal execution time code 128 (7) to the sequencer start command 126 (Precharge (PCh)), and the command-waiting signal 130 from the command-waiting generator 94 of FIG. 4 is enabled. The new (second) sequencer start command 126 (PCh) will not be executed until the sequencer state time code 132 reaches 7 for optimum command overlap. The, second SDRAM command sequence 136 (PCh B1, ACT B1, Rd B1) is executed when the sequencer state time code reaches 7. The command-sent signal 34 is enabled after command execution completion. The second SDRAM command sequence 136 (PCh B1, ACT B1, Rd B1) overlaps the corresponding SDRAM address 138 (Row B, Column X), and corresponding data (X1 . . . X8) is then sent along the data bus 34. A minimum data gap 140 of 2 clock cycles occurs between data sent (M1 . . . M8) due to the first command 136 (Act B1 Rd B1) and the data sent (X1 . . . X8) due to the second command sequence 136 (PCh B1, ACT B1, Rd B1).

Note that in the present example, the second memory command sequence 136 (PCh B1, ACT B1, Rd B1) involves reading a different row in bank B1, i.e., involves reading row A instead of row B (see SDRAM addresses 138). This represents a read followed by a read miss on the same bank (B1) cross-page access operation, wherein a different row (row B) is read from the same bank (B1). This requires first closing the row A (page A) via a precharge (PCh) operation, then opening a new page via an activate (ACT) operation, and then reading from the new page (page B) via a read operation (Rd). The optimum data gap for the cross-page access associated with the second command sequence 136 (PCh B1, ACT B1, Rd B1) is two clock cycles. Conventional state machine controller or pipelined controllers often yield data gaps of 4 or 3 clock cycles, respectively during such a cross-page operation, as discussed more fully below.

The third memory command sequence 136 (PCh B2, ACT B2, Rd B2) is initiated after the third command-start sequence 126 (PCh) is activated and assigned an optimal execution time code of 5; after the command-waiting signal 130 is enabled; and after the sequencer state time code 132 is equal to or greater than the execution time code (5). However, in the present example, the third sequencer start command 126 (PCh) and corresponding execution time code assignment 128 (5) arrives one clock cycle late. The command-waiting signal 130 is enabled when the sequencer state time code 132 is 6 rather than 5.

Although the sequencer 12' executes the third memory command 136 (PCh B2, ACT B2, Rd B2) as soon as possible, a data gap of 1 clock cycle 142 exists in the data bus sequence 144 between data bursts. The third memory command sequence 136 (PCh B2, ACT B2, Rd B2) reads from a different bank (B2) than the second command. Accordingly, if the combination of sequencer start command 126 and time code 128 of (PCh, 5) arrived on time, i.e., one clock cycle sooner, the data gap 142 would not exist.

The next command and time code generator 28' of FIG. 4 may generate the entire command sequence 136, and then pass it onto sequencer state machine 32', which then serially outputs commands. Alternatively, the next command and time code generator 28' generates the start command 126, and the sequencer state machine 32' generates the subsequent commands 136. This provides a more compact and simple design.

The command sequence 136 may also be called a memory control bus. The memory control bus 136, together with a memory address bus 138, form a command sequence bus. Thus, the first command may be considered as: ACT B1 Row A, Rd B1 Col M.

The exemplary timing diagram 120 is illustrates internal operations of the memory controller 12', which can minimize data gaps between consecutive memory cycles.

Figure 7:
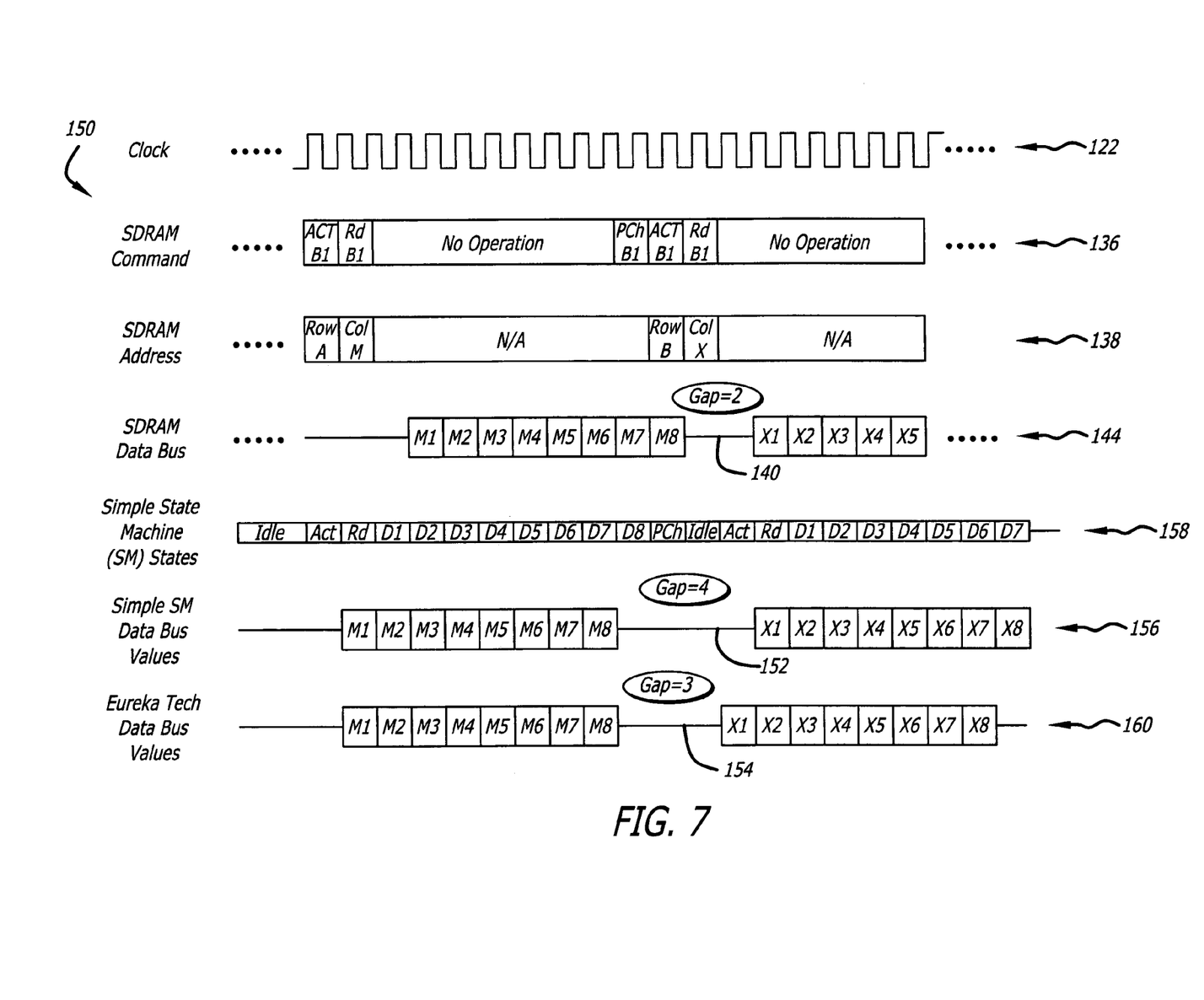
FIG. 7 is a timing diagram juxtaposing data gaps exhibited by a conventional state machine memory controller and a pipelined memory controller versus those exhibited by an embodiment of the present invention.

FIG. 7 is a timing diagram 150 juxtaposing data gaps 152, 154, 140 exhibited by a conventional state machine memory controller and a pipelined memory controller versus those exhibited by an embodiment 12' of the present invention, respectively. The data gaps 52, 154, 140 are associated with the second memory command sequence 136 (PCh B1, ACT B1, Rd B1) of FIG. 6, which represents a read followed by a read miss on the same bank (B1) cross-page access scenario.

With reference to FIGS. 3, 4, 6 and 7, the ESDRAM/SDRAM 16 is set to CL=1 and BL=8 mode, and all memory requests are read operations. As discussed with reference to FIG. 6, the data gap 140 in the data bus sequence 144 is only 2 clock cycles.

A conventional state machine data bus 156 exhibits the data gap 152 of 4 clock cycles. This excess data gap 152 results in reduced memory bandwidth and performance. An exemplary sequence of states 158 corresponding to the conventional state machine data bus 156 is shown.

A Eureka Tech pipelined controller data bus 160 exhibits a data gap 154 of 3 clock cycles (according to their specification). Hence, the memory controller 12' disclosed in FIG. 4 results in a small data gap and high memory bandwidth.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A computer with optimized memory management and control comprising:

a memory;

a computation system that generates memory requests;

a memory managing section that selectively controls data flow between said memory and said computation system based on memory requests and prioritizes said memory requests, providing prioritized requests in response thereto; and a memory controller that selectively services said prioritized requests at times determined by a current state of conmand servicing operations and an execution code assigned to each of said prioritized requests, said memory controller including an instruction decoder and a sequencer in a master-slave configuration, and wherein said current state of command servicing operations is represented by a sequencer state time code that is provided as feedback from said sequencer to said instruction decoder, said instruction decoder assigning said execution code to each prioritized request, and said sequencer comparing said execution code to said sequencer state time code to determine when a prioritized request should be serviced by said sequencer.

* * * * *